1

3,773,961
METHOD FOR PRODUCING PROTEIN CONTAINING BEVERAGE
Arthur L. Gordon, Des Plaines, Ill., assignor to Kraftco Corporation, Glenview, Ill.
No Drawing. Filed Jan. 18, 1971, Ser. No. 107,543
Int. Cl. A23l 1/00
U.S. Cl. 99—28                        10 Claims

ABSTRACT OF THE DISCLOSURE

A stable, acidic, aqueous, protein containing beverage is formed by blending a protein dispersion having an adjusted pH of from about 2.0 to less than 3.5 with an aqueous flavored substrate having a pH of less than about 6. When the pH of the substrate is greater than that of the protein dispersion, the blending is effected by adding the substrate to the dispersion. When the pH of the substrate is equal to or less than that of the protein dispersion, the sequence of blending is immaterial.

---

The present invention relates generally to beverage products and more particularly, relates to stabilized acidic, aqueous beverages which have protein incorporated therein.

Beverages of the type known as "soft drinks" are well known products. From a nutritional standpoint, soft drink beverages contain carbohydrates, which supply energy, but contain no protectin. Incorporation of protein into soft drink beverages is desirable. It is known to add protein to soft drink beverages which have a pH above the iso-electric pH of the protein used. Most proteins, such as cesins and soy protein, are markedly insoluble at the iso-electric point of the protein. The iso-electric point for most proteins is in the range of about pH 4–5. It is well known to provide casein and other proteins in soft drink beverages when the soft drink beverage has a pH above about 5. However, substantial problems are encountered in providing a protein source in soft drink beverages when the pH of the soft drink beverage is below the iso-electric point. It is difficult to reduce the pH of a soft drink beverage containing protein below the iso-electric point and avoid coagulation of the protein. It is, furthermore, difficult to provide a stabilized soft drink beverage containing protein when the pH of the beverage is maintained below the iso-electric point. Also, when a protein dispersion is maintained for a substantial period of time at a pH below the iso-electric point for the protein, there is a tendency for the protein to gel or thicken.

Accordingly, it is the principal object of the present invention to provide an acidic, aqueous beverage which includes a protein source. It is another object of the present invention to provide a stabilized, acidic, soft drink beverage which includes protein. It is a further object of the present invention to provide a stabilized, soft drink beverage containing protein with a pH below the iso-electric point for the protein.

These and other objects of the present invention will become more apparent from the following detailed description.

Generally, in accordance with various features of the present invention, a flavored, stabilized, proteinaceous beverage is provided. The beverage includes a mixture of flavoring materials, water, an edible acid and a proteinaceous material. The proteinaceous material may be any suitable protein, and may be selected from milk protein, animal protein, fish protein, vegetable protein and mixtures thereof. The edible acid is present in the beverage at a level sufficient to establish a pH in the beverage of less than about 4.

A method for preparing a stable, acidic, aqueous beverage containing proteinaceous materials is provided. The method includes providing a protein dispersion and adjusting the acidity of the protein dispersion to a pH below the iso-electric point for the protein by adding an edible acid to the protein dispersion. An aqueous, flavored base is also provided. Thereafter, the aqueous base and the protein dispersion are blended to provide a stabilized, protein containing beverage. The blending is effected by adding the aqueous base to the protein dispersion. The pH of the aqueous base is such as to maintain the pH of the blended beverage below the iso-electric point of the protein.

It is well known that a protein dispersion is more stable and has less tendency to precipitate protein when the pH of the protein dispersion is maintained above the iso-electric point for the protein. As used herein, the term "iso-electric point" refers to the pH or range of pH values at which the concentration of anions and the concentration of cations of the protein is susbtantially equal and the protein has the greatest tendency to become insoluble and to precipitate. It is also known that protein may be solubilized at a pH below the iso-electric point. However, when the pH of a protein dispersion is maintained below the iso-electric point, the tendency toward instability and precipitation of the protein is greatly enhanced over those dispersions where the pH is maintained above the iso-electric point. Consequently, it has not been considered feasible to provide acidic, soft drink beverages with protein when the acidic soft drink beverage has a pH below the iso-electric point.

The method of the present invention may be used to incorporate any suitable protein into a soft drink beverage. Preferred protein materials are proteins derived from milk, such as casein and serum protein, vegetable protein, such as soy protein, fish protein, such as that derived from fish meal concentrate, animal protein, such as albumin from eggs and mixtures thereof. Particularly preferred materials for reasons of flavor, economy and availability is casein and soy protein.

In the method of the invention, a protein source is blended with water to provide a protein dispersion. The protein source is provided at a level sufficient to provide from about 1 to about 8 percent protein in the dispersion. Thereafter, the protein dispersion is acidified by the addition of an edible acid to the dispersion. The edible acid is rapidly added to the protein dispersion, while the protein dispersion is maintaned under agitating conditions. The edible acid is added to a level and rate sufficient to reduce the pH of the protein dispersion to below the isoelectric point of the protein source as rapidly as possible. In general, the iso-electric point for the majority of protein sources is from about pH 4 to about pH 5. In accordance with the invention, it is desirable to reduce the pH of the protein dispersion to below about 3.5 and preferably to a pH within the range of from about 2.0 to about 3.3. Any edible acid may be used to acidify the protein dispersion. Suitable edible acids include phosphoric acid, hydrochloric acid, malic acid, citric acid, lactic acid, adipic acid, ascorbic acid, carbonic acid, acetic acid, tartaric acid, fumaric acid and mixtures thereof. Preferred edible acids for reasons of economy and flavor are phosphoric acid, citric acid, malic acid, and mixtures thereof. A particularly preferred system for reducing the pH of the protein dispersion is a mixture of phosphoric acid and malic acid. The mixture provides a particularly desirable flavor and mouth feel in the finished beverage product. It is preferred that the mixture have from about 1 to about 3 normal equivalents of malic acid per normal equivalent of phosphoric acid.

An aqueous, flavored base is then prepared. The aqueous flavored base generally includes water, flavoring material and may include a sweetening agent. Natural or artificial flavoring materials may be used to provide the aqueous base with any suitable flavor, such as lemon, lime, orange, cherry, strawberry, grape, cola and other fruits and vegetable flavors. The sweetening agent, when used, may be a natural or artificial sweetening material, such as sucrose, fructose, invert sugars, lactose, dextrose, corn syrup solids, saccharin, cyclamates, dipeptides and mixtures thereof.

The acidity of the aqueous flavored base is maintained at a level such that when the base is mixed with the protein dispersion, the acidity of the mixture will be below the iso-electric point for the protein material used. Generally, the acidity of the aqueous flavored base will be in the range of from about 2 pH to about 6 pH, preferably from about 2.5 pH to about 4.0 pH, and the pH of the mixture will be in the range of from about 2.0 to about 3.3. The level of use of the sweetening agent and the flavoring materials are sufficient to provide the desired levels of flavor and sweetness in the final beverage product.

In general, the protein dispersion and the aqueous flavored base are combined at levels which are sufficient to provide from about 2 to about 6 grams of protein per 8 ounces of the beverage product. Higher levels of protein may result in protein gelation or protein precipitation. Lower levels of protein may be used, but a less significant nutritional benefit is derived when the protein level in the beverage is below about 2 grams of protein per 8 ounces of beverage product. To achieve the desired level of protein, from about 150 gms. to about 300 gms. of aqueous flavored base is combined with from about 150 gms. to about 300 gms. of protein dispersion.

In accordance with the invention, it has been found that the protein dispersion and the aqueous flavored base should be combined in particular sequence and under particular conditions. In this connection, if the pH of the aqueous flavored base is higher than the pH of the protein dispersion the oqueous flavored base is added to the protein dispersion. If the protein dispersion is added to the aqueous flavored base, precipitation occurs. In general, the aqueous flavored base may be added as rapidly as possible to the protein dispersion, so long as agitating conditions are maintained. However, if the pH of the aqueous flavored base is equal to or lower than that of the protein dispersion the sequence and rate of addition is immaterial.

It has also been determined that the temperature of the mixture that results from blending the aqueous-flavored base with the protein dispersion should be within a predetermined range. In general, the temperature of the mixture should be from about 30° C. to about 60° C. When the temperature of the mixture is below about 30° C., precipitation of the protein may occur. When the temperature of the mixture is above about 60° C., gelling of the protein may occur. It is preferred that the temperature of the mixture be from about 35° C. to about 50° C. It is preferred that the temperature of the protein dispersion be above about 40° C. at the time of the blending to prevent any gelation of the protein prior to blending. In general, it is preferred that the temperature of the protein dispersion be within the range of from about 40° C. to about 80° C. The temperature of the aqueous flavored base may be at level which results in a mixture temperature within the range of from about 30° C. to about 60° C. Preferably the temperature of the aqueous flavored base is from about 10° C. to about 50° C. prior to blending.

The pH of the mixture that results by blending the aqueous flavored base and the protein dispersion must be below the isoelectric point for the protein used. For most proteins the pH of the mixture is preferably from about 2.5 to about 3.2. However, lower pH values can be used without disturbing the stability of the mixture but the acid flavor below about 2.5 pH is considered too pronounced. Higher pH values for the mixture up to about pH 4.0 may be used with certain protein materials, such as the serum protein of milk. However, at pH values above about 3.2 for most protein materials the mixture becomes destabilized and the protein precipitates.

The protein beverage of the invention may be carbonated if desired. In this connection, a protein beverage may be prepared in accordance with the method of the invention, which is concentrated with respect to protein and flavor levels. Carbonated water is then added thereto. In an alternative method for preparing a carbonated beverage, a flavored protein beverage is prepared having the desired level of protein and flavor in accordance with the invention. Thereafter, carbon dioxide gas is dispersed in the flavored protein beverage under suitable conditions of temperature and pressure. The carbonation of beverages is a well-known art, and suitable conditions are readily determined by one skilled in the art.

The following examples illustrate various features of the invention, but are intended to in no way limit the scope of the invention, which is defined in the appended claims.

EXAMPLE I

A lemon-lime flavored protein beverage is prepared in accordance with the method of the invention. Casein is used as the proteinaceous material in the beverage. For each six ounces of the lemon-lime flavored protein beverage to be prepared, three grams of casein are dispersed in 28.4 mls. of water. The casein dispersion, while being continuously stirred, is heated to a temperature of 75° C. 2.5 ml. of 6 N $H_3PO_4$ is added to the casein dispersion to provide a pH in the dispersion of 2.5.

An aqueous, lemon-lime flavored base is prepared having the following composition per gallon of base:

| Ingredients: | Amount |
| --- | --- |
| Sucrose | 6 lbs. |
| Anhydrous citric acid | 10 gms. |
| Fluid lemon-lime flavor concentrate | 2 oz. |
| Sodium benzoate | 7.75 gms. |
| Sodium citrate | 5.0 gms. |
| Color | 0.25 gms. |

The pH of the flavored base is 4.2. The temperature of the flavored base is adjusted to 35° C. and one gallon of the flavored base is then added to one gallon of the acidified protein dispersion to provide two gallons of a lemon-lime flavored beverage. The temperature of the acidified casein dispersion is 58° C. at the start of the addition of the lemon-lime flavored base to the casein dispersion. The temperature of the mixture is 43° C. and the pH of the mixture is 2.9.

After the addition of the flavored base to the casein dispersion, a stabilized lemon-lime flavored beverage is provided having three grams of protein for each six ounces of beverage.

EXAMPLE II

The lemon-lime flavored product of Example I is carbonated by dispersing carbon dioxide gas therein. The carbonated lemon-lime flavored product obtained has a desirable flavor and a light effervescent quality.

EXAMPLE III

A lemon-lime flavored beverage product is prepared in accordance with the procedure of Example I, with the exception that milk serum protein is used as the proteinaceous material. The milk serum protein is obtained by treating whey from a cheesemaking opertion by ultra filtration so as to remove lactose and salts from the whey and provide a whey product with about 35 to about 80 percent milk serum protein on a dry solids basis. The beverage obtained is stable for extended periods of time at room temperature and is stable indefinitely under refrigeration conditions.

EXAMPLE IV

A lemon-lime flavored beverage product is prepared in accordance with the procedure of Example I, with the exception that soy flour is used as the proteinaceous material. The soy flour used has a soy protein level of about 55 percent on a dry solids basis. Six grams of the soy flour are used for each six ounces of beverage product so as to provide three grams of soy protein in the beverage product. The beverage product obtained has a desirable lemon-lime flavor and is stable for extended periods of time at room temperature.

The method of the invention is used to provide a desirable, unique, proteinaceous beverage which is stable for extended periods of time without precipitation or gelling of protein. The beverage product has an acidity below the iso-electric point of the proteinaceous material used, and the method of the invention permits providing a stabilized, proteinaceous beverage having an acidity below the isoelectric point of the proteinaceous material.

What is claimed is:

1. A method for providing a stable, acidic, aqueous beverage containing protein comprising providing a protein dispersion, said protein being selected from the group consisting of casein, serum protein, soy protein, albumin and mixtures thereof, adjusting the acidity of said protein dispersion to a pH of from about 2.0 to less than about 3.5 by adding an edible acid to said protein dispersion, providing an aqueous, flavored substrate, said substrate having a pH higher than the pH of said protein dispersion but less than about 6, and blending said protein dispersion with said substrate to provide a stabilized, protein-containing beverage, said blending being effected by adding said substrate to said protein dispersion.

2. A method in accordance with claim 1 wherein said edible acid is added to said protein dispersion at a level sufficient to provide a pH in said protein dispersion of from about 2.0 to about 3.3.

3. A method in accordance with claim 1 wherein the temperature of said protein dispersion and said aqueous flavored substrate is such as to provide a beverage having a temperature, immediately after said blending, of from about 30° C. to about 60° C.

4. A method in accordance with claim 1 wherein the temperature of said protein dispersion and said aqueous flavored substrate is such as to provide a beverage having a temperature, immediately after said blending, of from about 35° C. to about 50° C.

5. A method in accordance with claim 1 wherein the temperature of the protein dispersion prior to said blending is within the range of from about 40° C. to about 80° C. and the temperature of the aqueous flavored substrate prior to blending is from about 10° C. to about 50° C.

6. A method in accordance with claim 1 wherein said stabilized protein-containing beverage is carbonated by the addition of carbon dioxide gas thereto.

7. A method in accordance with claim 1 wherein said protein is casein.

8. A method in accordance with claim 1 wherein said protein is soy protein.

9. A method in accordance with claim 1 wherein said substrate has a pH in the range of from about 2.5 to about 4.0 and the pH of said beverage is in the range of from about 2.5 to about 3.2.

10. A method in accordance with claim 1 wherein said protein dispersion and said substrate are combined at levels which are sufficient to provide from about 2 to about 6 grams of protein per 8 oz. of the beverage product.

References Cited

UNITED STATES PATENTS

| | | | |
|---|---|---|---|
| 1,218,190 | 3/1917 | Kummerlander | 99—28 |
| 1,237,723 | 8/1917 | Stein | 99—79 |
| 3,645,745 | 2/1972 | Magnino et al. | 99—17 |

OTHER REFERENCES

Markley, Soybeans and Soybean Products, 1950, vol. I, pp. 302–306, 340, 341.

Jacobs, Carbonated Beverages, 1959, pp. 68–71.

Bird et al., Low Temp. Hydrolysis of Comm. Proteins, Food Industries, February 1948, pp. 118–120.

Condensed Chemical Dictionary, 7th ed., 1966, pp. 185–186.

MORRIS O. WOLK, Primary Examiner

S. B. DAVIS, Assistant Examiner

U.S. Cl. X.R.

426—365, 364, 359, 330, 190

UNITED STATES PATENT OFFICE
CERTIFICATE OF CORRECTION

Patent No. 3,773,961        Dated November 20, 1973

Inventor(s) Arthur L. Gordon

It is certified that error appears in the above-identified patent and that said Letters Patent are hereby corrected as shown below:

Column 1, line 33 "cesins" should be --caseins--.

Column 2, lines 37 and 38, "preferred" insert -- protein --.

Column 2, line 48, "to" should be --at--.

Column 2, line 49, "isoelectric" should be --iso-electric--.

Column 3, line 38 "oqueous" should be --aqueous--.

Column 5, line 19 "isoelectric" should be --iso-electric--.

Signed and sealed this 17th day of September 1974.

(SEAL)
Attest:

McCOY M. GIBSON JR.        C. MARSHALL DANN
Attesting Officer           Commissioner of Patents